United States Patent
Szakalos et al.

(12) 
(10) Patent No.: US 12,362,074 B2
(45) Date of Patent: Jul. 15, 2025

(54) NUCLEAR REACTOR COMPRISING A REACTOR LID AND AN ADDITIONAL INNER LID

(71) Applicant: BLYKALLA REAKTORER STOCKHOLM AB, Stockholm (SE)

(72) Inventors: Peter Szakalos, Stockholm (SE); Janne Wallenius, Marsta (SE)

(73) Assignee: BLYKALLA REAKTORER STOCKHOLM AB, Stockholm (SE)

( * ) Notice: Subject to any disclaimer, the term of this patent is extended or adjusted under 35 U.S.C. 154(b) by 325 days.

(21) Appl. No.: 17/640,278

(22) PCT Filed: Sep. 4, 2020

(86) PCT No.: PCT/SE2020/050839
§ 371 (c)(1),
(2) Date: Mar. 3, 2022

(87) PCT Pub. No.: WO2021/045674
PCT Pub. Date: Mar. 11, 2021

(65) Prior Publication Data
US 2022/0344066 A1    Oct. 27, 2022

(30) Foreign Application Priority Data
Sep. 5, 2019 (SE) ................... 1951016-3

(51) Int. Cl.
*G21C 15/247* (2006.01)
*G21C 1/32* (2006.01)
*G21C 15/14* (2006.01)
*G21C 1/03* (2006.01)

(52) U.S. Cl.
CPC ............. *G21C 15/247* (2013.01); *G21C 1/32* (2013.01); *G21C 15/14* (2013.01); *G21C 1/03* (2013.01); *G21C 1/322* (2013.01)

(58) Field of Classification Search
CPC ........ G21C 15/247; G21C 1/32; G21C 15/14; G21C 1/03; G21C 1/322
(Continued)

(56) References Cited

U.S. PATENT DOCUMENTS 3,548,931 A * 12/1970 Germer .................... G21C 1/03
376/290
4,608,224 A    8/1986 Brachet
(Continued)

FOREIGN PATENT DOCUMENTS

CN    107636769 A    1/2018
CN    108885911 A    11/2018
(Continued)

OTHER PUBLICATIONS

International Search Report dated Oct. 20, 2020, for International Patent Application No. PCT/SE2020/050839.
(Continued)

*Primary Examiner* — Jack W Keith
*Assistant Examiner* — Daniel Wasil
(74) *Attorney, Agent, or Firm* — KARCESKI IP LAW, PLLC

(57) ABSTRACT

A liquid-metal-cooled nuclear reactor includes a main vessel containing a primary fluid and a cylindrical separation structure, separating a hot leg from a cold leg. The cold leg encompasses the hot leg. At least one opening is provided in the cylindrical separation structure to enable the primary fluid to flow from the cold leg to the hot leg. A core is submerged in the hot leg. The reactor also includes at least one heat exchanger having an inlet from the hot leg and an outlet to the cold leg for transferring heat from the primary fluid to a secondary fluid of an externally connecting circuit. A reactor lid covers the main vessel. A gas plenum is disposed beneath the reactor lid and above the hot leg. An
(Continued)

inner lid is disposed beneath the reactor lid covering the cold leg. The hot leg is open ended towards the gas plenum.

9 Claims, 2 Drawing Sheets

(58) Field of Classification Search
USPC .................................................. 376/402, 406
See application file for complete search history.

(56) References Cited

U.S. PATENT DOCUMENTS

| | | |
|---|---|---|
| 2008/0310575 A1 | 12/2008 | Cinotti |
| 2019/0019585 A1 | 1/2019 | Beck et al. |
| 2019/0156961 A1 | 5/2019 | Cinotti |

FOREIGN PATENT DOCUMENTS

| | | |
|---|---|---|
| EP | 3271923 A1 | 1/2018 |
| JP | S62226089 A | 10/1987 |
| JP | H01150892 A | 6/1989 |
| WO | 9828754 A1 | 7/1998 |
| WO | 2016147139 A1 | 9/2016 |

OTHER PUBLICATIONS

Extended European Search Report dated Sep. 27, 2022, for European Patent Application No. 20861766.2.

Chinese Office Action dated Feb. 22, 2025, for Chinese Patent Application No. 202080075924.1.

* cited by examiner

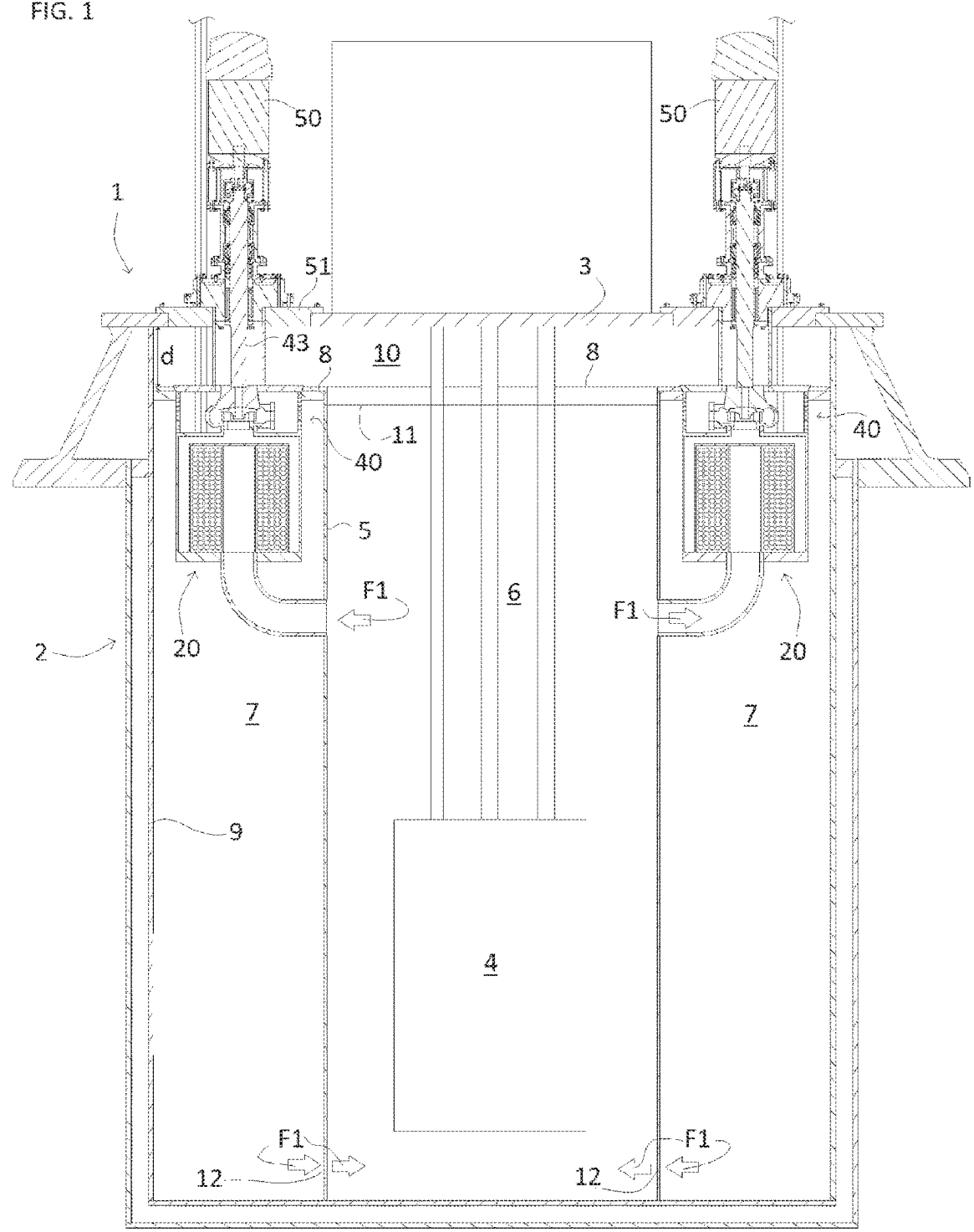

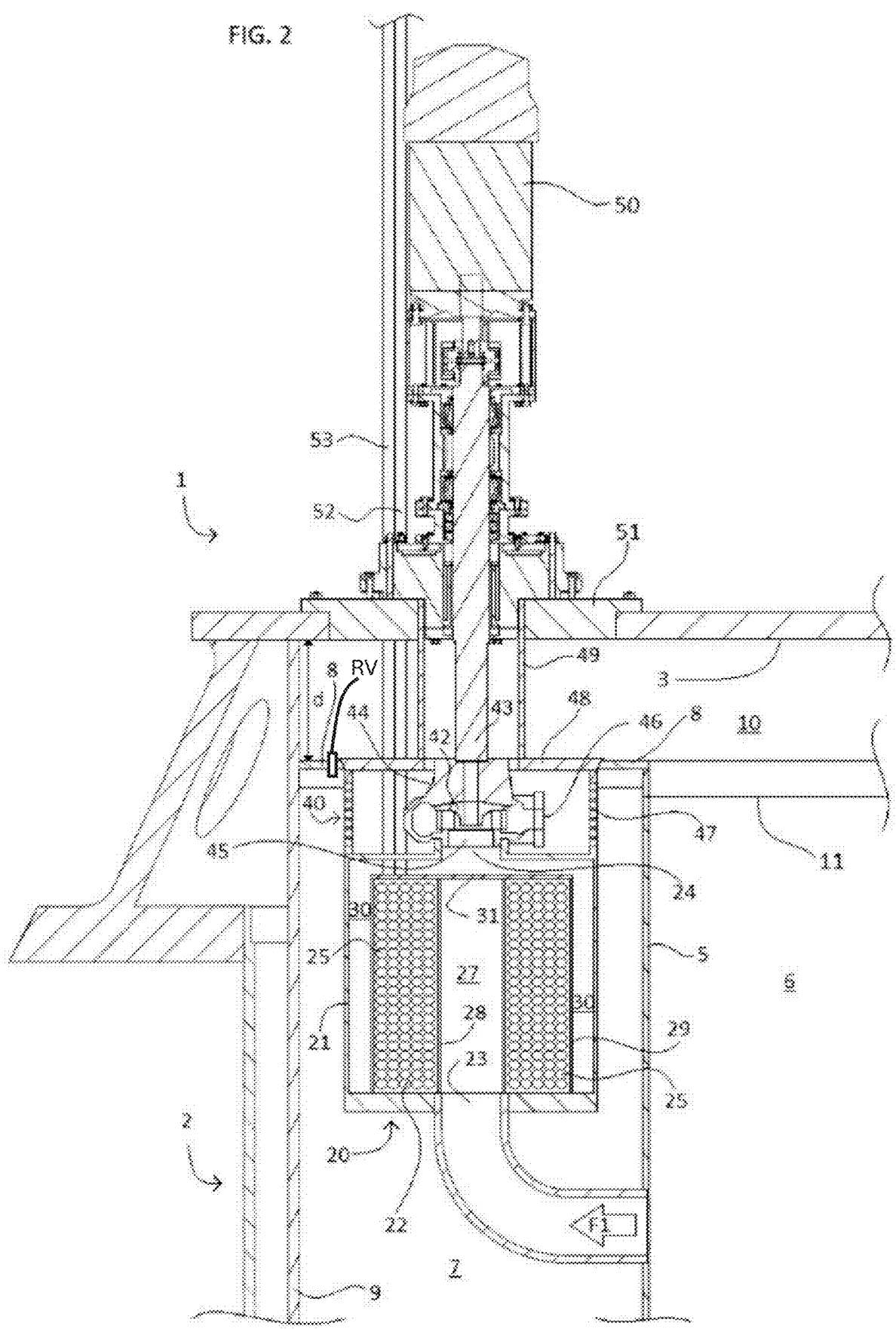

NUCLEAR REACTOR COMPRISING A REACTOR LID AND AN ADDITIONAL INNER LID

CROSS-REFERENCE TO RELATED APPLICATION(S)

This is a National Stage Entry into the United States Patent and Trademark Office from International Patent Application No. PCT/SE2020/050839, filed on Sep. 4, 2020, which claims priority to Swedish Patent Application No. SE 1951016-3, filed on Sep. 5, 2019, the entire contents of both of which are incorporated herein by reference.

FIELD OF THE INVENTION

The invention relates to a nuclear reactor, in particular a liquid-metal-cooled nuclear reactor, comprising:
- a main vessel containing a primary fluid, said primary fluid being a liquid metal or alloy;
- a cylindrical separation structure extending vertically within the vessel, and separating a hot leg from a cold leg, the cold leg encompassing the hot leg, and at least one opening is provided in the cylindrical separation structure to enable fluid flow from the cold leg to the hot leg;
- a core submerged in the hot leg for heating the primary fluid;
- at least one heat exchanger having an inlet from the hot leg and outlet to the cold leg for transferring the heat from the primary fluid to a secondary fluid of an externally connecting circuit;
- at least one primary fluid circulation pump or circulating the primary fluid in the main vessel and pressurising one of the legs;
- a reactor lid covering the main vessel; and
- a gas plenum beneath the reactor lid and above the hot leg and the cold leg.

BACKGROUND

A liquid metal cooled nuclear reactor is an advanced type of nuclear reactor where the primary coolant is a liquid metal or alloy, such as lead, lead-alloys, mercury, or natrium. In a pool type design, the entire core and heat exchangers are submerged into a pool of the liquid metal coolant. A cylindrical separation structure extends vertically within the reactor vessel, and separates a hot leg, in which the core is submerged, from a cold leg around the hot leg. Due to the operation of primary fluid circulation pump/s there is a difference in fluid level between the hot leg and the cold leg in such reactors, which can be up to a few meters.

Due to the reactor vessel height, the large dead weight of liquid metal and the large free surface of the molten coolant, seismic loading and sloshing may become a large problem.

Furthermore, the cost of constructing the nuclear reactor highly depends on the size of the primary system.

Hence, it would therefore be desirable to reduce the costs of producing the reactor.

It would also be desirable to decrease vulnerability to earthquakes.

It would also be desirable to prolong the life span of the primary circulation pumps.

SUMMARY OF THE INVENTION

We therefore suggest the nuclear reactor initially mentioned, wherein an inner lid is provided beneath the reactor lid to cover the pressurised leg, whereas the other leg being open ended towards the gas plenum and the reactor lid.

The inner lid enables the covered leg to have an over pressure in relation to the other leg. This reduces the fluid level difference between the cold leg and the hot leg and therefore makes it possible to reduce the required height of the reactor vessel substantially, and thereby also the volume of the reactor vessel. For instance, 1 bar over pressure may possibly reduce the height of the nuclear reactor vessel by 1 m, which can yield huge cost savings. Reducing height of the reactor vessel further the reduces the height of the building it is housed in etc. Furthermore, it reduces the required length of pump shaft, which reduces vibrations and can yield an increased life span thereof. Sloshing problems are also reduced since a large portion of the pool is covered.

Other preferred aspects may be that:
- the covered leg is pressurised to an over pressure in the range of 0.5-10 bar compared to the other leg, when the pumps are operating.
- the primary fluid circulation pump comprising a pump discharge connecting to the covered leg.
- the inner lid is provided with a pressure relief means in case the over pressure extends a predetermined threshold, preferably in the form of at least one pressure relief valve.
- the distance between the inner lid and the reactor lid is the range of 0.1-1 m, preferably 30-50 cm.
- the pump is driven by pump motor on top of the reactor lid, said pump motor connecting to the impeller via a pump shaft passing through the reactor lid, gas plenum and the inner lid. Thereby the seal and bearings at the reactor lid is protected from liquid coolant.
- the pump shaft of respective pump is sealed with a labyrinth seal at the inner lid. The labyrinth seal might leak some liquid metal but that is acceptable since it will just flow back on the inner lid to the open liquid metal surface (hot leg)
- the primary fluid circulation pump comprising an impeller arranged on top of the heat exchanger, preferably not more than 0.5 m beneath the reactor lid. Thereby the pump is in relatively colder zone of the reactor which reduces wear and corrosion.
- the inner lid covers the cold leg, whereas the hot leg being open ended towards the reactor lid.
- the at least one primary fluid circulation pump is submerged in the cold leg;
- the at least one heat exchanger is submerged in the cold leg; and/or
- the primary fluid circulation pump comprising a pump discharge connecting to the cold leg.

BRIEF DESCRIPTION OF THE DRAWINGS

FIG. 1 shows a simplified sketch of a liquid cooled nuclear reactor.

FIG. 2 shows a simplified zoomed-in view of a heat exchanger and pump assembly in a liquid cooled nuclear reactor.

DESCRIPTION OF EMBODIMENT(S) OF THE INVENTION

FIGS. 1-2 show a nuclear reactor 1, in particular a liquid-metal-cooled nuclear reactor, comprising a cylindrical main vessel 2 covered by a reactor lid 3, and a core 4 in the vessel 2. A cylindrical separation structure 5, i.e. a core barrel, extends vertically within the vessel and separates a central hot leg 6 from a cold leg 7 encompassing the hot leg 6. At least one opening 12 is provided in the cylindrical separation structure 5 to enable fluid flow from the cold leg 7 to the hot leg 6. The core 4 is submerged in the hot leg 6 and heats a primary fluid F1, e.g. a liquid metal or alloy such as lead, lead-alloys, mercury, or natrium, which circulates in the vessel 2 to transfer heat from the core 4 to a plurality of heat exchangers 20, thereby cooling the core 4. The heat exchangers 20 transfers the heat from the primary fluid F1 to a secondary fluid F2, e.g. water, via connecting pipes 52, 53 to an external circuit (not shown) as known in the art.

An inner lid 8 is provided to cover the leg 6, 7 on the high-pressure side—in the shown example the cold leg 7. The inner lid 8 extends horizontally between the upper end of the cylindrical separation structure 5 and an inner wall 9 of the main vessel 2. A gas plenum 10 is upwardly delimited by the reactor lid 3, downwardly delimited by the inner lid 8 and the fluid level 11 of the hot leg 6, and radially delimited by the inner walls 9 of the vessel 2. The distance d between the inner lid 8 and the reactor lid 3 can e.g. be in the range of 0.1-1 m, preferably 30-50 cm. A blanket gas, e.g. argon, is provided to the gas plenum 10. The inner lid 8 may be provided with a pressure relief means in order to handle pressure build-up in the cold leg 7 in the case of a tube rupture in one of the heat exchangers 20, i.e. in case the over pressure extends a predetermined threshold. For instance, by providing at least one pressure relief valve RV to the inner lid 8, to let out steam into the gas plenum 10. The reactor lid 3 is gas tight but may also be provided with one or more pressure relief valve/s. The reactor lid 3 may be water cooled if desired.

A primary fluid circulation pump 40 is mounted on top of each heat exchanger 20, each pump 40 is driven by a corresponding pump motor 50. The motor 50 drives the pump 40 via a pump shaft 43. Each pump shaft 43 is sealed with gas tight seal at the level of the reactor lid 3, i.e. between the exterior of the vessel 2 and gas plenum 10.

The motor 50, the pump 40, and the heat exchanger 20 forms an integral unit 20, 40 which is partly inserted into the reactor 1 through openings in the reactor lid 3 and corresponding openings in the inner lid 8, such that the pump 40 and the heat exchanger 20 is submerged in the cold leg 7, whereas the motor 50 stays outside the main vessel 2. Each motor 50 mounted on a corresponding reactor lid closure plate 51 that closes the openings of the reactor lid 3.

A connecting structure 49 connects the reactor lid closure plate 51 to the upper of the integral unit 20, 40, which is an inner lid closure plate 48 that closes the corresponding opening in the inner lid 8. The closure plate 48 having a downward facing bevelled edges and the opening in the inner lid 8 has upward facing bevelled edges of complementary shape. The connecting structure 49 can e.g. be several rods or cylinder with openings towards the gas plenum 10.

The pump 40 comprises a pump casing 44 housing an impeller 42 driven by the pump shaft 43. The pump shaft 43 of respective pump 40 is sealed with a labyrinth seal between gas plenum 10 and the cold leg 7. The pump casing 44 is arranged on top of the heat exchanger 20 and beneath the inner lid closure plate 48. The pump casing 44 has a pump suction inlet 45 facing vertically downwards which connects to a heat exchanger outlet 24. The pump casing 44 has a pump discharge 46 for discharging the primary fluid F1 to the cold leg 7 in a radial direction. A third cylindrical perforated shell 47, functioning as a flow diffuser encompasses the pump casing 44, such that the pump discharge 46 will face the third perforated shell 47.

Each impeller 42 is arranged to be beneath the fluid level 11 of primary fluid F1 the pumps 40 are not operating. Preferably, each impeller 42 is not more than 0.5 m beneath the inner lid 8. The pumps 40 provide an operating over pressure of 0.5-10 bar to the cold leg 7 in relation to the hot leg 6. Hence, when the pumps 40 are running the fluid level 11 of the hot leg 6 will be lower than that of the cold leg 7.

Each heat exchanger 20 comprises a cylindrical shell 21 having a heat exchanger inlet 23 connected to the hot leg 6 and the heat exchanger outlet 24 connecting to the pump 40 for discharging the cooled primary fluid F1 to the cold leg 7, and a tube bundle 22 housed in the shell 21 which conveys the secondary fluid F2. The tube bundle 22 connecting to an inlet pipe 52 and an outlet pipe 53 for connecting to the external circuit. Preferably the numbers of heat exchangers 20 are in the range of 5-20, and evenly distributed in the cold leg 7 around the hot leg 6. In one example there are 12 heat exchangers 20.

Each tube bundle 22 comprises a plurality of flat spiral tube layers 25 set on top of one another to form a substantially annular tube bundle. The tube bundle 22 delimits a substantially cylindrical inner zone 27 extending in a vertical direction. The inner zone 27 is fluidly connected to heat exchanger inlet 23 for receiving the primary fluid F1 from the hot leg 6. Each tube layer 25 has a tube inlet in the inner zone 27 which are connected to an inlet pipe 52 extending through the inner lid 8 and the reactor lid 3 for connecting to the external circuit. The secondary fluid F2 is supplied to the tube bundle 22 via the inlet pipe 52. Each tube layer 25 has a tube outlet at the periphery of each layer 25 which are connected to an outlet pipe 53 extending through the inner lid 8 and the reactor lid 3 for connecting to the external circuit (not shown).

A first vertically extending cylindrical perforated shell 28 is arranged in the inner zone 27 meeting the tube bundle 22 in the radial directions. This enables the primary fluid F1 from the heat exchanger inlet 23 to exit the inner zone 27 in radial directions through the perforations into the tube bundle 22. A top plate 31 extends on top of the tube bundle 22, closing tube bundle 22 and its inner zone 27 in the vertical direction. Thereby, the primary fluid F1 is prevented to exit the tube bundle 22 and its inner zone 27 in the vertical direction.

A second vertically extending cylindrical perforated shell 29 is arranged around tube bundle 22. The perforated shells 28, 29 functions as flow diffusers. The cylindrical shell 29 have a diameter that is smaller than the inner diameter of the shell 21 and thereby forming an annular volume 30 between the second perforated shell 29 and the shell 21. Thereby the primary fluid F1 can exit the tube bundle 22 in radial direction via the perforations of the second perforated shell 29 in order to enter the annular volume 30. The annular volume 30 is fluidly connected to the heat exchanger outlet 24.

The materials of the pump impeller 42, the perforated shells 28, 29, 47 and the tubes in the tube bundle 22 are selected so that erosion resulting from interaction with liquid metal are reduced. Such materials could for example be chosen from: alumina forming ferritic steels, alumina forming austenitic steels, stainless steel surface alloyed or coated with a protective alumina forming austenitic or ferritic alloy.

In the shown example the cold leg is pressurised. In an alternative embodiment the hot leg is instead pressurised. In this embodiment the primary fluid circulation pump is configured to pressurise the hot leg. This can for instance by achieved by removing the primary circulation pumps 40 from the top of the heat exchangers 20, and positioning them with the suction inlet 45 in the cold leg 7 and the pump discharge 46 connecting to the opening/s 12 to the hot leg 6. In this embodiment the hot leg is provided with an inner lid.

The invention claimed is:

1. A liquid-metal-cooled nuclear reactor, comprising:
   a main vessel containing a primary fluid, said primary fluid being a liquid metal or alloy;
   a cylindrical separation structure extending vertically within the main vessel, separating a hot leg from a cold leg, the cold leg encompassing the hot leg;
   at least one opening provided in the cylindrical separation structure to enable the primary fluid to flow from the cold leg to the hot leg;
   a core submerged in the hot leg for heating the primary fluid;
   at least one heat exchanger having an inlet from the hot leg and an outlet to the cold leg for transferring heat from the primary fluid to a secondary fluid of an externally connecting circuit;
   at least one primary fluid circulation pump for circulating the primary fluid in the main vessel, wherein the at least one primary fluid circulation pump establishes a fluid level of the primary fluid in the hot leg lower than a fluid level of the primary fluid in the cold leg; and
   a reactor lid covering the main vessel;
   a gas plenum disposed beneath the reactor lid and above the hot leg; and
   an inner lid disposed beneath the reactor lid, wherein the inner lid covers the cold leg,
   wherein the hot leg is open ended towards the gas plenum.

2. The liquid-metal-cooled nuclear reactor according to claim 1, wherein the cold leg is pressurised to a pressure in a range of 0.5-10 bar, compared to the hot leg, when the at least one primary fluid circulation pump is operating.

3. The liquid-metal-cooled nuclear reactor according to claim 1, wherein the at least one primary fluid circulation pump comprises a pump discharge connecting to the cold leg.

4. The nuclear liquid-metal-cooled reactor according to claim 1, wherein the inner lid is provided with at least one pressure relief valve.

5. The nuclear liquid-metal-cooled reactor according to claim 1, wherein the distance between the inner lid and the reactor lid is within a range of 0.1-1 m.

6. The liquid-metal-cooled nuclear reactor according to claim 1, wherein the at least one primary fluid circulation pump is driven by a pump motor on top of the reactor lid, the pump motor connecting to an impeller via a pump shaft passing through the gas plenum.

7. The nuclear liquid-metal-cooled reactor according to claim 1, wherein the at least one primary fluid circulation pump comprises an impeller arranged on top of the heat exchanger, at a distance not more than 0.5 m beneath the inner lid.

8. The nuclear liquid-metal-cooled reactor according to claim 1, fulfilling at least one of the following conditions:
   the at least one primary fluid circulation pump is submerged in the cold leg;
   the at least one heat exchanger is submerged in the cold leg; and
   the at least one primary fluid circulation pump comprises a pump discharge connecting to the cold leg.

9. The nuclear liquid-metal-cooled reactor according to claim 1, wherein the distance between the inner lid and the reactor lid is within a range of 30-50 cm.

* * * * *